(12) United States Patent
Lechlitner et al.

(10) Patent No.: US 11,236,825 B1
(45) Date of Patent: Feb. 1, 2022

(54) OPERATING CONTINUOUSLY VARIABLE TRANSMISSION AT DISCRETE RATIOS

(71) Applicant: Ford Global Technologies, LLC, Dearborn, MI (US)

(72) Inventors: Craig Lechlitner, Belleville, MI (US); Seth Anthony Bryan, Royal Oak, MI (US); Tyler James-Ray Kaldobsky, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/096,625

(22) Filed: Nov. 12, 2020

(51) Int. Cl.

| | |
|---|---|
| *F16H 59/44* | (2006.01) |
| *F16H 61/664* | (2006.01) |
| *F16H 61/02* | (2006.01) |
| *F16H 59/70* | (2006.01) |
| *B60W 10/105* | (2012.01) |
| *B60W 10/06* | (2006.01) |
| *F16H 61/66* | (2006.01) |
| *F16H 59/36* | (2006.01) |

(52) U.S. Cl.
CPC ......... *F16H 61/6646* (2013.01); *B60W 10/06* (2013.01); *B60W 10/105* (2013.01); *F16H 59/44* (2013.01); *F16H 59/70* (2013.01); *F16H 61/0204* (2013.01); *F16H 2059/366* (2013.01); *F16H 2061/6616* (2013.01); *F16H 2061/6617* (2013.01)

(58) Field of Classification Search
CPC ............... F16H 61/66646; F16H 59/44; F16H 61/0204; F16H 2061/6617; F16H 2059/366; F16H 59/70; F16H 2059/704; F16H 2061/6615; F16H 2061/6616; B60W 10/06; B60W 10/101; B60W 10/105
USPC ............................................... 477/37; 701/54
See application file for complete search history.

(56) References Cited

U.S. PATENT DOCUMENTS

| | | | |
|---|---|---|---|
| 2015/0166048 A1* | 6/2015 | Herrmann | B60W 20/30 701/22 |
| 2019/0249768 A1* | 8/2019 | Kishi | F16H 61/0213 |
| 2021/0025492 A1* | 1/2021 | Okahara | F16H 59/044 |
| 2021/0054930 A1* | 2/2021 | Benedikt | B60W 20/15 |

FOREIGN PATENT DOCUMENTS

| | | | | |
|---|---|---|---|---|
| CN | 106574597 B | * | 6/2019 | ........ F02D 41/0225 |
| CN | 111365449 A | * | 7/2020 | |
| JP | 2005221009 A | * | 8/2005 | |
| WO | 2019-062879 A1 | | 4/2019 | |
| WO | WO-2019176549 A1 | * | 9/2019 | ............. F16H 59/44 |

OTHER PUBLICATIONS

English Translation of JP2005221009; http://translationportal.epo.org; Sep. 2, 2021 (Year: 2021).*

\* cited by examiner

*Primary Examiner* — Roger L Pang
(74) *Attorney, Agent, or Firm* — David B. Kelley; Brooks Kushman P.C.

(57) ABSTRACT

A vehicle includes an engine, a continuously variable transmission, and a controller. The controller, responsive to a request to manually shift the continuously variable transmission and the engine being on, operates the continuously variable transmission atone of a predetermined number of discrete ratios such that a speed of the engine changes by at least a predetermined amount.

20 Claims, 2 Drawing Sheets

OPERATING CONTINUOUSLY VARIABLE TRANSMISSION AT DISCRETE RATIOS

TECHNICAL FIELD

This disclosure relates to the control of hybrid vehicles.

BACKGROUND

In certain hybrid powertrain configurations, engine speed may not be proportional to vehicle speed.

SUMMARY

A vehicle includes an engine, a continuously variable transmission, and a controller. The controller, responsive to a request to manually upshift the continuously variable transmission and the engine being on, operates the continuously variable transmission at one of a predetermined number of discrete ratios of engine speed to vehicle speed such that the engine speed decreases by at least a predetermined amount and the one of the predetermined number of discrete ratios is a highest of the predetermined number of discrete ratios that permits the engine speed to decrease by at least the predetermined amount.

A method of controlling a vehicle includes, responsive to a request to manually shift a continuously variable transmission of the vehicle and an engine of the vehicle being on, operating the continuously variable transmission at one of a predetermined number of discrete ratios of engine speed to vehicle speed such that the engine speed changes by at least a predetermined amount.

A vehicle includes an engine, a continuously variable transmission, and a controller. The controller, responsive to a request to manually shift the continuously variable transmission and the engine being on, operates the continuously variable transmission at one of a predetermined number of discrete ratios of engine speed to vehicle speed such that the engine speed changes by at least a predetermined amount.

DETAILED DESCRIPTION

Embodiments are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one of ordinary skill in the art. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain manual shift modes may allow a driver to cycle between gears. In some power split hybrid applications however, the transmission is an electronic continuously-variable transmission, meaning no physical step gears exist. As a result, virtual gears can be implemented via a control strategy to simulate the feeling of a step-gear shift. To give the virtual feel of a step-gear shift, some of the strategies contemplated herein require the engine to be on and use audible noise from the engine in partnership with wheel torque changes to give the feeling of a shift.

Requesting a downshift via movement of a paddle or lever provided on a steering wheel or front console for example typically results in an increase in engine speed and wheel torque, and vice versa for an upshift. Because power split hybrids have battery capacity, there may be circumstances in which a driver will request entry into manual shift mode when in an all-electric driving state (engine OFF). This may raise two issues: how to select the initial gear when the engine is OFF, and how to select the initial gear when the engine is ON. As discussed in more detail below, when the engine is off, initial gear selection may be based on a vehicle speed range associated with each gear. When the engine is on, initial gear selection may be based on engine speed.

If vehicle speed or transmission output shaft speed were used alone in selecting the appropriate gear when the engine is already on, a driver-expected change in engine speed may not occur upon a manual request for shift as during power split powertrain operation, engine speed may not be proportional to vehicle speed.

Figure 1:
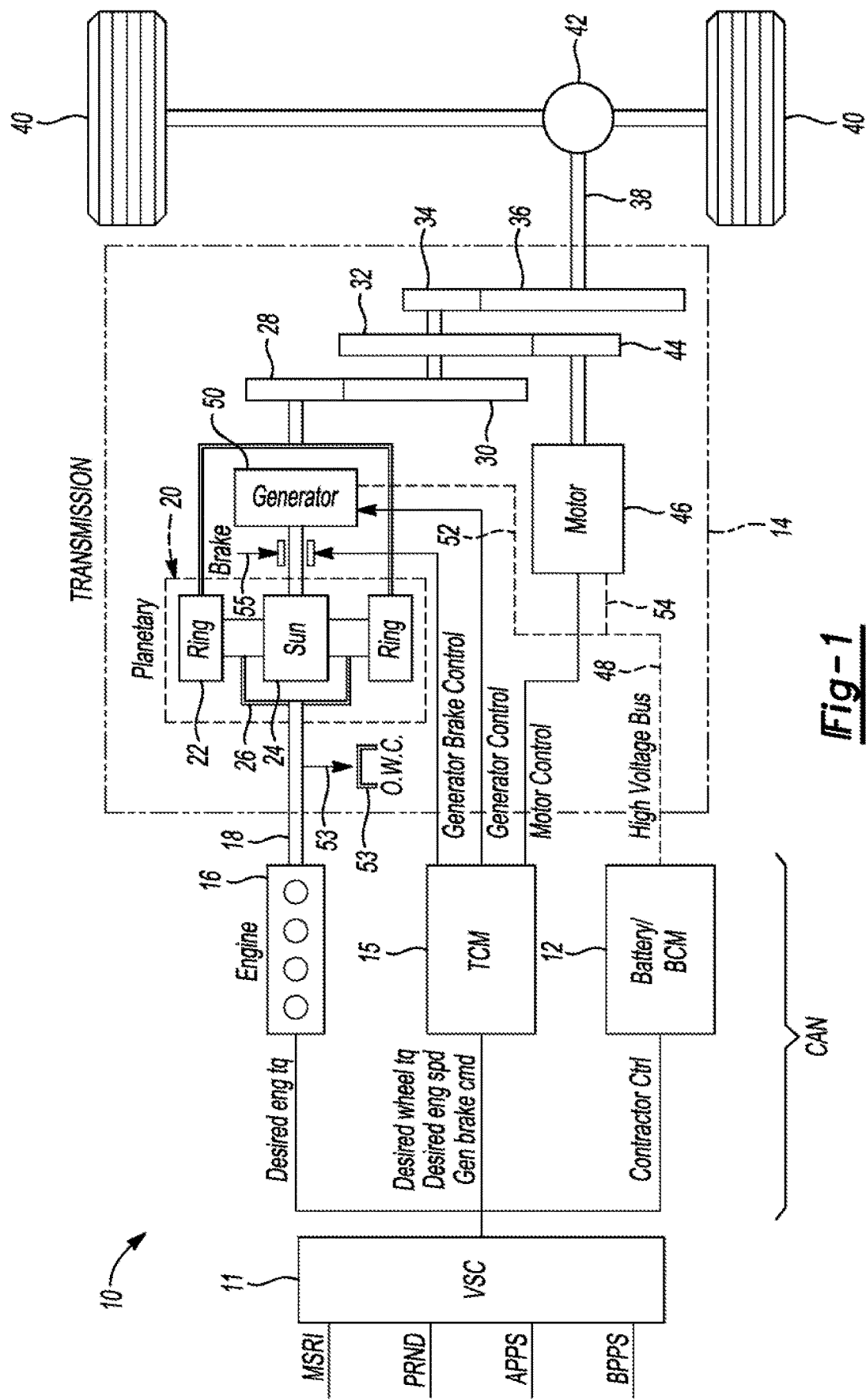
FIG. 1 is a schematic diagram of a hybrid electric vehicle.

With reference to FIG. 1, a power split hybrid vehicle 10 includes a vehicle system controller (VSC) 11, a battery 12, a transaxle 14, and a transaxle control module 15 together with a motor-generator subsystem, that are under control of a controller area network (CAN). An engine 16, controlled by module 11, distributes torque through torque input shaft 18 to transmission 14. The module 11 receives, among other things, manual shift request information (MSRI) input by the driver via paddles, levers, or the like, PRND status, accelerator pedal position information (APPS), and brake pedal position information (BPPS) in known fashion.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transaxle is drivably connected to traction wheels 40 through a differential and axle mechanism 42.

The gears 30, 32, and 34 are mounted on a countershaft, the gear 32 engaging a motor-driven gear 44. Electric motor 46 drives the gear 44, which acts as a torque input for the countershaft gearing 30, 32, 34.

The battery 12 delivers electric power to the motor 46 through power flow path 48. Generator 50 is connected electrically to the battery 12 and to the motor 46 in known fashion, as shown at 52, 54.

When the battery 12 is acting as a sole power source with the engine 16 off, the torque input 18 and the carrier assembly 26 are braked by an overrunning coupling 53. A mechanical brake 55 anchors the rotor of the generator 50 and the sun gear 24 when the engine 16 is on and the powertrain is in a parallel drive mode, the sun gear 24 acting as a reaction element.

There are thus two power sources for the driveline. The first power source is a combination of the engine 16 and generator subsystems, which are connected together using the planetary gear unit 20. The other power source involves only the electric drive system including the motor 46, the generator 50, and the battery 12, where the battery 12 acts as an energy storage medium for the generator 50 and the motor 46.

Fuel is delivered to the engine 16 under the control of the operator in known fashion using an engine throttle. Engine power delivered to the planetary gear unit 20 can be expressed as $T_e\omega_e$, which is the product of engine torque $T_e$ and engine speed $\omega_e$. Power delivered from the planetary ring gear 22 to the countershaft gears 30, 32, 34 can be expressed as $T_r\omega_r$, which is the product of ring gear torque $T_r$ and ring gear speed $\omega_r$. Power out from the transmission 14 can be expressed as $T_s\omega_s$, which is the product of torque of the shaft 38 $T_s$ and speed of the shaft 38 $\omega_s$.

The generator 50, when it is acting as a motor, can deliver power to the planetary gearing 20. Alternatively, it can be driven by the planetary gearing 20. Similarly, power distribution between the motor 46 and the countershaft gears 30, 32, 34 can be distributed in either direction. Driving power from the battery 12 or charging power to the battery 12 is bi-directional.

Engine output power can be split into two paths by controlling the generator speed. The mechanical power flow path, $T_r\omega_r$, is from the engine 16 to the carrier 26 to the ring gear 22 to the countershaft. The electrical power flow path is from the engine 16 to the generator 50 to the motor 46 to the countershaft. The engine power is split, whereby the engine speed is disassociated from the vehicle speed during a so-called positive split mode of operation. In this condition, the engine 16 delivers power to the planetary gearing 20, which delivers power to the countershaft gears 30, 32, 34, which in turn drives the wheels 40. A portion of the planetary gearing power is distributed to the generator 50, which delivers charging power to the battery 12. The speed of the generator 50 at that time is greater than zero or positive, and the generator torque is less than zero. The battery 12 drives the motor 46, which distributes power to the countershaft. This arrangement is a "positive power split."

If the generator 50, due to the mechanical properties of the planetary gear unit 20, acts as a power input to the planetary gear unit 20 to drive the vehicle, the operating mode can be referred to as a "negative power split." The generator speed and generator torque are also both negative.

The generator 50 delivers power to the planetary gear unit 20 as the motor 46 acts as a generator and the battery 12 is charging. It is possible, however, that under some conditions the motor 46 may distribute power to the countershaft gearing 30, 32, 34 if the resulting torque at the wheels 40 from the gearing 30, 32, 34 does not satisfy the driver demand. Then the motor 46 must make up the difference.

If the generator brake 55 is activated, a parallel operating mode is established: A condition in which the engine 16 is on and the generator 50 is braked. The battery 12 powers the motor 46, which powers the countershaft gearing 30, 32, 34 simultaneously with delivery of power from the engine 16 to the planetary gearing 20 to the countershaft gearing 30, 32, 34.

The first source of power can deliver torque only for forward propulsion because there is no reverse gear in the countershaft gearing 30, 32, 34. The engine 16 requires either generator control or a generator brake to permit transfer of power to the wheels 40 for forward motion.

The second source of power, as previously described, is the battery 16, generator 50, and motor subsystem. In this driving mode, the engine 16 is braked by the overrunning coupling 53. The electric motor 46 draws power from the battery 12 and effects propulsion independently of the engine 16, with either forward or reverse motion. The generator 50 may draw power from the battery 12 and drive against a reaction of the one-way coupling 53. The generator 50 in this mode operates as a motor.

As previously indicated, the two power sources are integrated so that they seamlessly work together to meet the driver's demand for power without exceeding the system's power limits, including battery limits, while maintaining powertrain efficiency and performance. The system will determine the driver's demand for torque and can achieve the optimum split of power between the two power sources.

Figure 2:
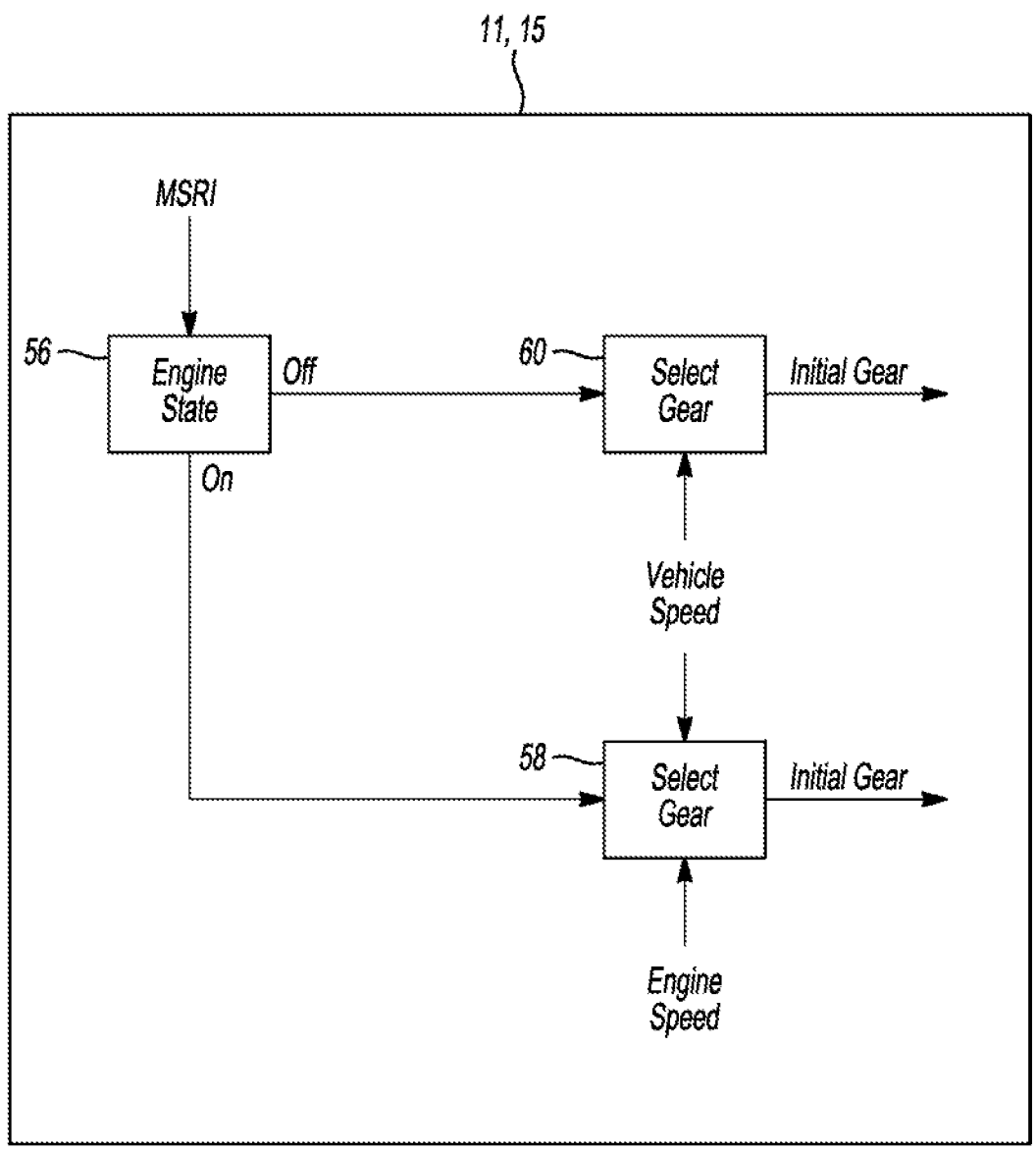
FIG. 2 is a flow chart of an algorithm for controlling a transmission.

With reference to FIGS. 1 and 2, in response to a request for a manual shift, engine state is determined at operation 56. If the engine 16 is on, engine speed and vehicle speed are used to select the gear at operation 58. If the engine 16 is off, vehicle speed is used to select the gear at operation 60.

When not in manual shift mode, the transmission 14 is operated as an electronic continuously-variable transmission as mentioned above. Once the driver requests a manual shift however, a predetermined number (e.g., six, eight, etc.) of different virtual step gears may be instantiated. That is, once a driver enters manual shift mode, the transmission 14 may be controlled to permit one of, for example, eight different ratios ($\alpha$, $\beta$, $\gamma$, $\delta$, $\varepsilon$, $\zeta$, $\eta$, $\theta$) between the input shaft 18 and output shaft 38—as opposed to an infinite number. If the engine 16 is ON when a manual shift is requested, one of the eight ratios may be selected such that the engine speed changes (increases for a downshift or decreases for an upshift) at least by a predetermined amount (e.g., 200 revolutions per minute, 500 revolutions per minute, etc.). The predetermined amount may also depend on the current engine speed: The lower the engine speed, the lower the predetermined amount. If engine speed is 2000 revolutions per minute when the driver requests a manual shift, the predetermined amount may be 150 revolutions per minute. If engine speed is 3500 revolutions per minute when the driver requests a manual shift, the predetermined amount may be 400 revolutions per minute.

The engine 16 in one example may have a speed of 3300 revolutions per minute while the vehicle 10 is travelling at 50 miles per hour. If the driver requests a downshift manually, thus putting the vehicle 10 in manual shift mode, the system controller 11 may examine a table including vehicle speed, engine speed, and gear data: The system controller 11 may select the highest one of the eight gears that will produce at least a 300 revolutions per minute increase in engine speed: If implementing each of the gears would result in an associated change in engine speed, given the vehicle 10 is travelling 50 miles per hour, as defined by the example table below, the system controller 11 would select gear 5. (The $\Delta$ RPM may be different for each of the eight gears given a different engine speed.)

TABLE 1

Example Virtual Gear vs. $\Delta$ RPM

| Virtual Gear | $\Delta$ RPM |
|---|---|
| 1 | 1000 |
| 2 | 830 |
| 3 | 680 |
| 4 | 520 |
| 5 | 330 |
| 6 | −290 |
| 7 | −310 |
| 8 | −500 |

If the driver instead requests an upshift manually, the system controller 11 may select the lowest one of the eight gears that will produce at least a 300 revolutions per minute decrease in engine speed: gear 7.

If the engine 16 is OFF when a manual shift is requested, one of the eight ratios may again be selected. In these circumstances, vehicle speed is used to make this selection.

TABLE 2

Example Virtual Gear vs. Vehicle Speed

| Virtual Gear | Vehicle Speed (RPM) |
|---|---|
| 1 | 0-10 |
| 2 | 11-20 |
| 3 | 21-30 |
| 4 | 31-40 |
| 5 | 41-50 |
| 6 | 51-60 |
| 7 | 61-70 |
| 8 | 71-90 |

Once the gear is selected, the system controller 11 may instruct the transaxle control module 15 to implement the selected gear via the transmission 14 such that the input shaft 18 and output shaft 38 operate at the ratio defined by the selected gear.

Representative control strategies and/or logic are described that may be implemented using one or more processing strategies such as event-driven, interrupt-driven, multi-tasking, multi-threading, and the like. As such, various steps or functions illustrated may be performed in the sequence described, in parallel, or in some cases omitted. Although not always explicitly illustrated, one of ordinary skill in the art will recognize that one or more of the contemplated steps or functions may be repeatedly performed depending upon the particular processing strategy being used. Similarly, the order of processing is not necessarily required to achieve the features and advantages described herein, but is provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. For example, hybrid vehicle configurations other than that suggested by FIG. 1 are also contemplated. Moreover, the words controller and controllers may be used interchangeably.

The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
a continuously variable transmission; and
a controller programmed to, responsive to a request to manually upshift the continuously variable transmission and the engine being on, operate the continuously variable transmission at one of a predetermined number of discrete ratios of engine speed to vehicle speed such that the engine speed decreases by at least a predetermined amount and the one of the predetermined number of discrete ratios is a highest of the predetermined number of discrete ratios that permits the engine speed to decrease by at least the predetermined amount.

2. The vehicle of claim 1, wherein the predetermined amount depends on the engine speed at a time of the request to manually upshift the continuously variable transmission such that as the engine speed decreases the predetermined amount decreases.

3. The vehicle of claim 1, wherein the controller is further programmed to, responsive to a request to manually downshift the continuously variable transmission, operate the continuously variable transmission at another one of the predetermined number of discrete ratios such that the engine speed increases by at least the predetermined amount and the another one of the predetermined number of discrete ratios is a lowest of the predetermined number of discrete ratios that permits the engine speed to increase by at least the predetermined amount.

4. The vehicle of claim 1, wherein the controller is further programmed to, responsive to the request and the engine being off, start the engine.

5. The vehicle of claim 4, wherein the controller is further programmed to operate the continuously variable transmission at one of the predetermined number of discrete ratios such that an initial speed of the engine depends on the vehicle speed.

6. The vehicle of claim 1, wherein the continuously variable transmission is an electronic continuously variable transmission.

7. A method of controlling a vehicle comprising:
responsive to a request to manually shift a continuously variable transmission of the vehicle and an engine of the vehicle being on, operating the continuously variable transmission at one of a predetermined number of discrete ratios of engine speed to vehicle speed such that the engine speed changes by at least a predetermined amount.

8. The method of claim 7, wherein the predetermined amount depends on the engine speed at a time of the request to manually shift the continuously variable transmission such that as the engine speed decreases the predetermined amount decreases.

9. The method of claim 7, wherein responsive to the request being a request for upshift, the one of the predetermined number of discrete ratios is a highest of the predetermined number of discrete ratios that permits the engine speed to decrease by at least the predetermined amount.

10. The method of claim 7, wherein responsive to the request being a request for downshift, the one of the predetermined number of discrete ratios is a lowest of the predetermined number of discrete ratios that permits the engine speed to increase by at least the predetermined amount.

11. The method of claim 7 further comprising, responsive to the request and the engine being off, starting the engine.

12. The method of claim 11 further comprising operating the transmission at one of the predetermined number of discrete ratios such that an initial speed of the engine depends on the vehicle speed.

13. The method of claim 12, wherein the initial speed increases as the vehicle speed increases.

14. A vehicle comprising:
an engine;
a continuously variable transmission; and
a controller programmed to, responsive to a request to manually shift the continuously variable transmission and the engine being on, operate the continuously variable transmission at one of a predetermined number of discrete ratios of engine speed to vehicle speed such that the engine speed changes by at least a predetermined amount.

15. The vehicle of claim 14, wherein the predetermined amount depends on the engine speed at a time of the request to manually shift the continuously variable transmission such that as the engine speed decreases the predetermined amount decreases.

16. The vehicle of claim 14, wherein responsive to the request being a request for upshift, the one of the predetermined number of discrete ratios corresponds to a highest of the predetermined number of discrete ratios that permits the engine speed to decrease by at least the predetermined amount.

17. The vehicle of claim 14, wherein responsive to the request being a request for downshift, the one of the predetermined number of discrete gear ratios corresponds to a lowest of the predetermined number of discrete ratios that permits the engine speed to increase by at least the predetermined amount.

18. The vehicle of claim 14, wherein the controller is further programmed to, responsive to the request and the engine being off, start the engine.

19. The vehicle of claim 18, wherein the controller is further programmed to operate the transmission at one of the predetermined number of discrete ratios such that an initial speed of the engine depends on the vehicle speed.

20. The vehicle of claim 19, wherein the continuously variable transmission is an electronic continuously variable transmission.

* * * * *